US009935439B2

(12) United States Patent
Witherbee et al.

(10) Patent No.: US 9,935,439 B2
(45) Date of Patent: Apr. 3, 2018

(54) MOUNTING BRACKET FOR ELECTRICAL OR COMMUNICATION DEVICE

(71) Applicant: Cooper Technologies Company, Houston, TX (US)

(72) Inventors: Martin Lee Witherbee, Godfrey, IL (US); Lalit Subhash Khairnar, Aakurdi (IN); Sagar Ashok Patil, Pune (IN)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/456,000

(22) Filed: Mar. 10, 2017

(65) Prior Publication Data

US 2017/0187174 A1 Jun. 29, 2017

Related U.S. Application Data

(62) Division of application No. 14/811,278, filed on Jul. 28, 2015.

(30) Foreign Application Priority Data

Apr. 15, 2015 (IN) .......................... 1055/DEL/2015

(51) Int. Cl.
  *A47B 96/06* (2006.01)
  *H02G 3/12* (2006.01)
  (Continued)

(52) U.S. Cl.
  CPC ............. *H02G 3/125* (2013.01); *F16B 2/245* (2013.01); *F16M 13/022* (2013.01)

(58) Field of Classification Search
  CPC .......... H02G 3/125; H02B 1/32; F16M 13/02; F16M 13/022
  (Continued)

(56) References Cited

U.S. PATENT DOCUMENTS 649,545 A 5/1900 McConley
736,831 A 8/1903 Eidt
(Continued)

OTHER PUBLICATIONS

Non-Final Office action for U.S. Appl. No. 14/811,278, dated Jun. 7, 2017, 8 pages.
(Continued)

*Primary Examiner* — Todd M Epps
(74) *Attorney, Agent, or Firm* — Senniger Powers LLP

(57) ABSTRACT

A stud mounting bracket for a junction box includes a mounting extension extending outward from a longitudinal end margin of a main body. The mounting extension includes a mounting body connected to the longitudinal end margin of the main body and an extension tab connected to the mounting body. The extension tab is pivotable relative to the mounting body about an axis from a compact configuration to an extended configuration to increase the length of the mounting extension. A box mounting bracket for mounting a junction box on a stud mounting bracket includes first and second jaws. The first and second jaws engage the stud mounting bracket for use in attaching the box mounting bracket to the stud mounting bracket. The first and second jaws are resiliently deflectable both relative to the base and independent of one another when attaching the box mounting bracket to the stud mounting bracket.

20 Claims, 17 Drawing Sheets

(51) Int. Cl.
*F16M 13/02* (2006.01)
*F16B 2/24* (2006.01)

(58) Field of Classification Search
USPC ..... 174/61, 57, 58, 53, 63; 220/3.2, 3.3, 3.7, 220/3.9, 3.92, 3.94; 248/228.7, 228.6, 248/231.71, 231.81, 316.1, 316.7, 343, 248/342, 227.4, 228.1, 226.11
See application file for complete search history.

(56) References Cited

U.S. PATENT DOCUMENTS

| | | | |
|---|---|---|---|
| 749,222 A | 1/1904 | Purdy | |
| 1,056,759 A | 3/1913 | Mallery | |
| 1,365,093 A | 1/1921 | D'arcy | |
| 1,408,970 A | 3/1922 | Ayer | |
| 1,523,744 A | 1/1925 | Ayer | |
| 1,624,187 A | 4/1927 | Schlafly | |
| 2,713,983 A | 7/1955 | Kay | |
| 2,729,414 A | 1/1956 | Clark | |
| 2,732,162 A | 1/1956 | McKinley | |
| 3,019,954 A | 2/1962 | Faltin | |
| 3,104,087 A | 9/1963 | Budnick et al. | |
| 3,606,223 A | 9/1971 | Havener | |
| 3,684,230 A | 8/1972 | Swanquist | |
| 3,720,395 A | 3/1973 | Schuplin | |
| 3,780,209 A | 12/1973 | Schuplin | |
| 3,804,359 A | 4/1974 | Cumber | |
| 4,362,284 A | 12/1982 | Bolante | |
| 4,747,506 A | 5/1988 | Stuchlik, III | |
| 4,787,587 A | 11/1988 | Deming | |
| 4,971,280 A | 11/1990 | Rinderer | |
| 5,004,199 A | 4/1991 | Suk | |
| 5,209,444 A * | 5/1993 | Rinderer | H02G 3/126 248/205.1 |
| 5,386,959 A * | 2/1995 | Laughlin | H02B 1/015 248/200.1 |
| 5,405,111 A | 4/1995 | Medlin, Jr. | |
| 5,595,362 A | 1/1997 | Rinderer et al. | |
| 5,619,263 A | 4/1997 | Laughlin et al. | |
| 5,810,303 A | 9/1998 | Bourassa et al. | |
| 5,934,631 A | 8/1999 | Becker et al. | |
| 5,954,304 A | 9/1999 | Jorgensen | |
| 6,076,788 A | 6/2000 | Akiyama | |
| 6,098,945 A | 8/2000 | Korcz | |
| 6,386,488 B1 | 5/2002 | Menachem | |
| 6,484,979 B1 | 11/2002 | Medlin, Jr. | |
| 6,484,980 B2 | 11/2002 | Medlin, Sr. et al. | |
| 6,491,270 B1 | 12/2002 | Pfaller | |
| 6,768,071 B1 | 7/2004 | Gretz | |
| 7,073,757 B2 | 7/2006 | Johnson et al. | |
| 7,360,745 B2 | 4/2008 | Nikayin et al. | |
| 7,472,875 B2 | 1/2009 | Rinderer | |
| 8,091,721 B1 | 1/2012 | Gretz | |
| 8,403,277 B2 * | 3/2013 | Nuernberger | H02G 3/125 174/58 |
| 8,702,047 B2 | 4/2014 | Nuernberger et al. | |
| 9,261,120 B2 * | 2/2016 | Colangelo | F16B 2/22 |
| 2006/0237601 A1 | 10/2006 | Rinderer | |
| 2007/0063121 A1 | 3/2007 | Oh | |
| 2007/0084617 A1 | 4/2007 | Dinh | |
| 2007/0194188 A1 | 8/2007 | Johnson | |
| 2007/0200039 A1 | 8/2007 | Petak | |
| 2017/0093140 A1 * | 3/2017 | Nikayin | H02G 3/125 |

OTHER PUBLICATIONS

Erico International Corporation, Fixing, Fastening & Support Products for Electrical Installation & Datacom and Telecom Applications, catalog, 2015, pp. 178-179.

International Search Report and Written Opinion for PCT/US16/27438, dated Aug. 31, 2016, 18 pages.

* cited by examiner

MOUNTING BRACKET FOR ELECTRICAL OR COMMUNICATION DEVICE

CROSS-REFERENCE TO RELATED APPLICATIONS

The present application claim is a continuation application of U.S. application Ser. No. 14/811,278, filed Jul. 28, 2015, the entirety of which is hereby incorporated by reference.

FIELD OF THE DISCLOSURE

The present disclosure generally relates to a mounting bracket for mounting an electrical or communication device on a wall stud.

BACKGROUND OF THE DISCLOSURE

Typically, an electrical or communication device is installed in a building using a mounting bracket. The communication device is fastened to the mounting bracket, and in turn, the mounting bracket is fastened to framing (e.g., a wall stud). In some circumstances, junction boxes are used to house and protect electrical and communication devices, such as electrical outlets, electrical switches, associated electrical wiring, communication terminals (e.g., terminals for fiber optics), and associated communication cables (e.g., optical fiber cables). The junction box is secured to the mounting bracket, so that, in turn, the electrical or communication device is secured to the mounting bracket.

SUMMARY OF THE DISCLOSURE

In one aspect, a stud mounting bracket for a junction box generally comprises an elongate main body having a length and opposite longitudinal end margins. A mounting extension extends outward from one of the longitudinal end margins of the main body. The mounting extension has a length extending from the longitudinal end margin of the main body to a free end of the mounting extension. The mounting extension includes a mounting body connected to the longitudinal end margin of the main body and an extension tab connected to the mounting body. The extension tab is pivotable relative to the mounting body about an axis from a compact configuration to an extended configuration to increase the length of the mounting extension.

In another aspect, a box mounting bracket for mounting a junction box on a stud mounting bracket generally comprises a base having a front face, a rear face, an upper edge margin and a lower edge margin. The base is constructed for attaching a junction box to the front face thereof. A first jaw extends rearward from one of the upper and lower edge margins of the base. The first jaw is configured to engage the stud mounting bracket for use in attaching the box mounting bracket to the stud mounting bracket. A second jaw extends rearward from one of the upper and lower edge margins of the base. The first jaw is configured to engage the stud mounting bracket for use in attaching the box mounting bracket to the stud mounting bracket. The first and second jaws are resiliently deflectable both relative to the base and independent of one another when attaching the box mounting bracket to the stud mounting bracket.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
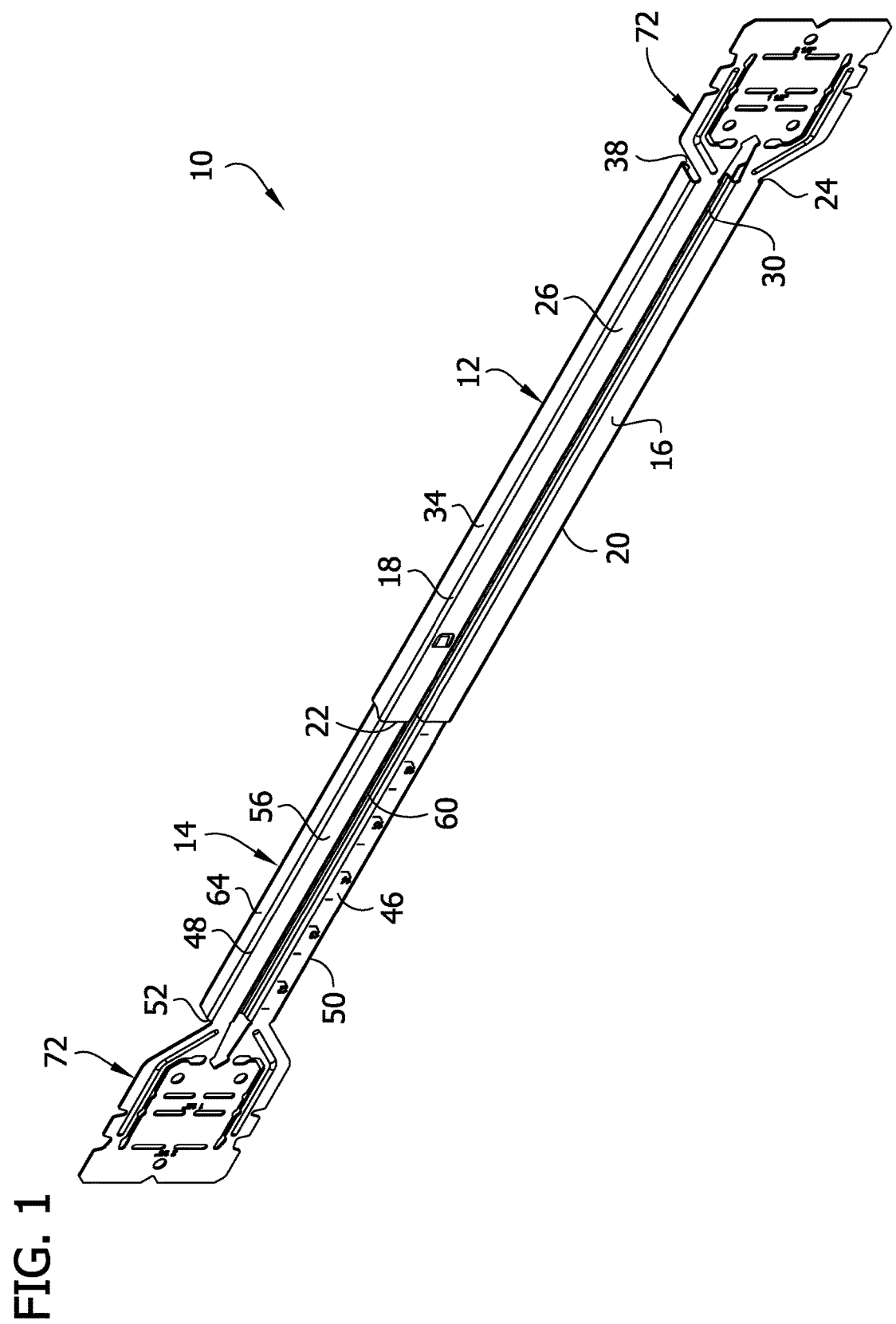
FIG. 1 is a perspective of one embodiment of a stud mounting bracket for an electrical or communication device, showing an initial configuration of the stud mounting bracket.
Figure 2:
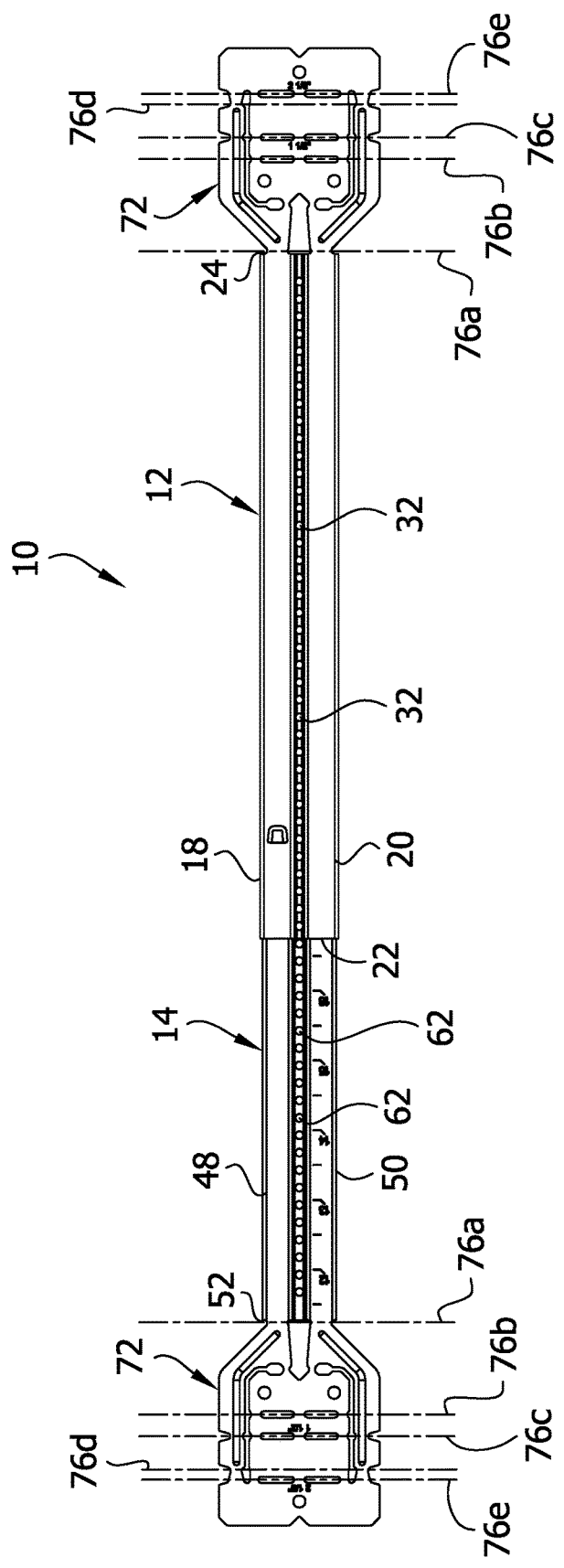
FIG. 2 is a front elevation of the stud mounting bracket of FIG. 1.

Referring to FIGS. 1-8, a first embodiment of a stud-to-stud mounting bracket (i.e., a stud mounting bracket) for mounting an electrical or communication device (or the like) between wall studs (e.g., metal wall studs) is generally indicated at reference numeral 10. In this embodiment, the stud mounting bracket 10 is an adjustable bracket in the form of a telescoping bar assembly comprising outer and inner bars 12, 14, respectively, telescopically and slidably connected to one another to permit adjustment of the length of the stud mounting bracket. Each telescoping bar 12, 14 may be a unitary, one-piece construction. Each bar 12, 14 may be formed from a single sheet metal (e.g., steel or aluminum) or other suitable material. In FIGS. 1 and 2, the stud mounting bracket 10 is shown in an initial configuration. As set forth below, in general the stud mounting bracket 10 is configured to be bent from the initial configuration to a plurality of different mounting configurations. The orientation of the stud mounting bracket 10 in the drawings provides the point of reference for the terms defining relative locations and positions of structures and components of the bracket, including but not limited to the terms "upper," "lower," "left," "right," "top," "bottom," "forward," and "rearward," as used throughout the present disclosure.

Referring still to FIGS. 1-8, the outer bar 12 includes a main body 16 that is generally rectangular having opposite upper and lower edge margins 18, 20, opposite left and right end margins 22, 24, a front face 26, a rear face 28, and a forwardly-opening, generally horizontal channel 30 extending the length of the main body and located approximately midway between the upper and lower edge margins. A plurality of pilot holes 32 (as shown in FIG. 2) are spaced along a bottom wall of the channel 30 at regular intervals and can be used to attach a junction box to the bar 12. A pair of integral upper and lower flanges 34, 36, respectively, extends generally horizontally rearward from the respective upper and lower edge margins 18, 20. Lips (or return flanges) 38, 40 extend from the respective flanges 34, 36 generally toward each other. Likewise, the inner bar 14 includes a main body 46 that is generally rectangular having opposite upper and lower edge margins 48, 50, opposite left and right end margins 52, 54, a front face 56, a rear face 58, and a forwardly-opening, generally horizontal channel 60 extending the length of the main body and located approximately midway between the upper and lower edge margins. A plurality of pilot holes 62 (FIG. 2) are spaced along a bottom wall of the channel 60 at regular intervals and can be used to attach a junction box to the bar 14. A pair of integral upper and lower flanges 64, 66 extends generally horizontally rearward from the respective upper and lower edge margins 48, 50. Lips (or return flanges) 68, 70 extend from the respective flanges 64, 66 generally toward each other. The outer and inner bars 12, 14 are similar, with the outer bar 12 having a slightly larger cross section than the inner bar 14 such that the inner bar fits inside the outer bar 12 with the front face 56, flanges 64, 66, and lips 68, 70 of the inner bar 14 generally in sliding engagement with the respective front face 26, flanges 34, 36, and lips 38, 40 of the outer bar 12.

Each of the outer and inner bars 12, 14 includes a mounting extension 72 extending laterally outward from the corresponding outer end margin 24, 52 of the corresponding main body 16, 46, such that the stud mounting bracket 10 includes a mounting extension 72 at each longitudinal end. In general, these mounting extensions 72 are used to secure the stud mounting bracket 10 to wall studs WS using suitable fasteners S (e.g., standard self-tapping sheet metal screws), as shown in FIGS. 4, 5, 7, and 8, for example. Only one mounting extension is described in detail below, with the understanding that both telescoping bars include substantially similar mounting extensions extending from one end thereof. It is understood that the stud mounting bracket 10 may include the mounting extension 72 at only one longitudinal end thereof. It is also understood that the stud mounting bracket 10 may be a fixed length mounting bracket, rather than an adjustable length mounting bracket.

Referring to FIGS. 1-8, the mounting extension 72 is configurable to one of a plurality of mounting configurations for mounting different size junction boxes J to the wall studs WS. When fastened to the stud mounting bracket 10, the junction box J, or a box plate BP attached to the junction box, is generally aligned with a front mounting surface F1 of the wall stud WS. As an example, the stud mounting bracket 10 is suitable for use with the junction boxes J having the following known sizes (length of upper and lower sides×length of left and right sides): 4×4 in, $4^{11}/_{16} \times 4^{11}/_{16}$ in, 5×5 in, and multi-gang boxes.

Figure 3:
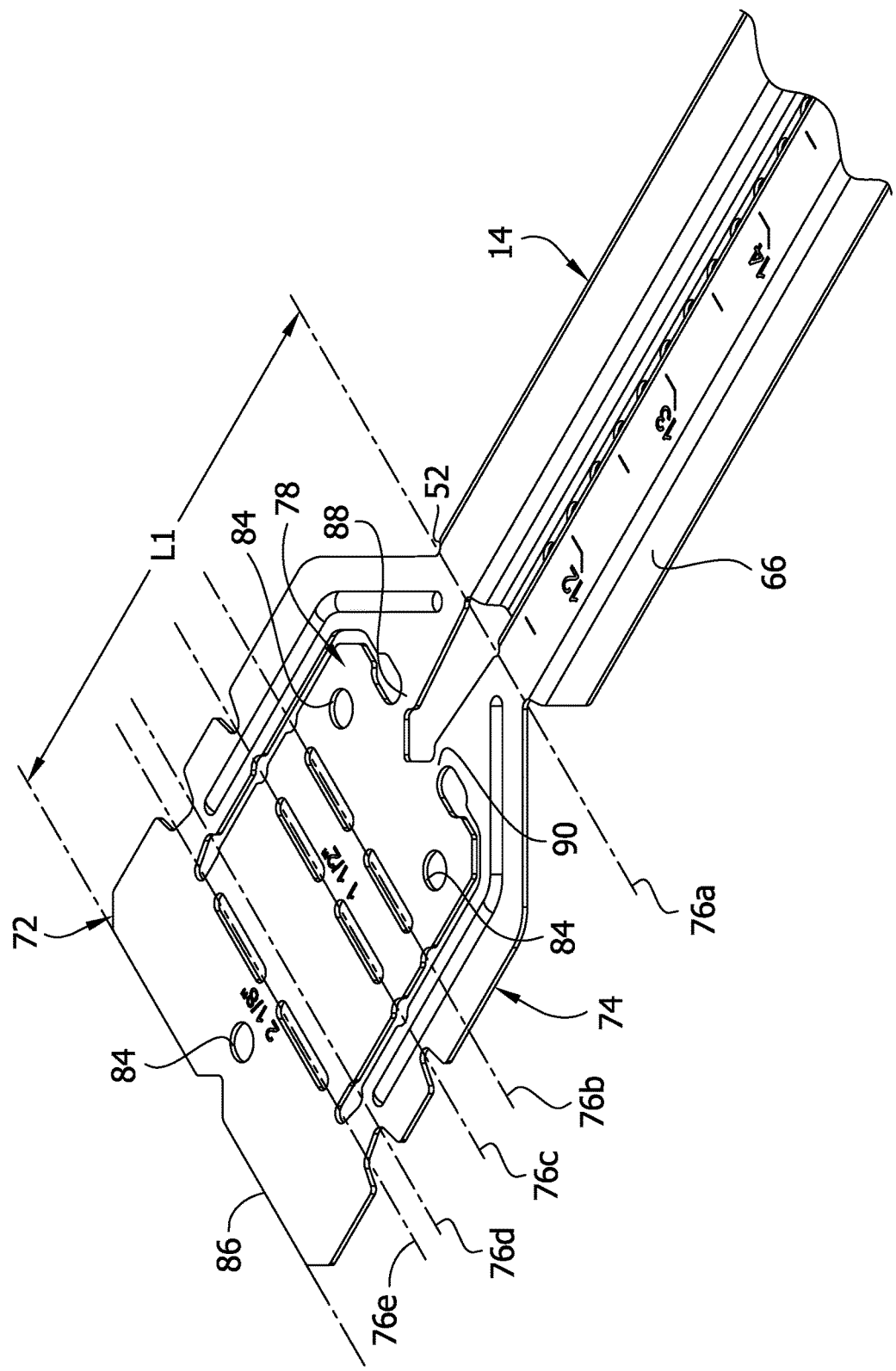
FIG. 3 is an enlarged partial view of the stud mounting bracket of FIG. 1.

With reference to FIGS. 2 and 3, the mounting extension 72 includes an elongate, generally rectangular mounting body, generally indicated at 74, extending laterally outward from one of the end margins of the stud mounting bracket 10 (e.g., the left end margin 52 of the main body 46 of the inner bar 14), and an extension tab 78 which, in the illustrated embodiment, is connected to the mounting body. An interior section of the mounting extension 72 comprises the extension tab 78. An exterior section of the mounting body 72 comprises the mounting body 74. The mounting body 74 and extension tab 78 are generally planar in the initial configuration shown in FIGS. 1-3. As explained in more detail below, the mounting body 74 and/or extension tab 78 are configured for bending about spaced apart bending axes 76a-76e extending generally transverse (e.g., perpendicular) to the mounting body and/or extension tab. Bending areas of the mounting body 74 define the bending axes 76a-76e to allow for configuring the mounting extension 72 into a selected one of the mounting configurations depending on the size of the junction box J to be secured to the wall studs WS using the stud mounting bracket 10. For example, the bending areas may comprise lines of weakness to facilitate bending of the mounting body 74 about the bending axes 76a-76e. As seen in FIGS. 2 and 3, the lines of weakness may be at least partially defined by notches (or cutouts) and/or openings (e.g., slots) in the mounting body 74. The bending axes 76a-76e pass through these notches and/or openings. Other suitable ways of facilitating bending of the mounting body 74 and/or the extension tab 78 about the bending axes 76a-76e do not depart from the scope of the present invention. For example, thinning material at the bending locations or rigidifying the mounting body at opposite sides of the bending locations may facilitate bending about the bending axes 76a-76e.

When the mounting extension 72 is in a selected mounting configuration (see, e.g., FIGS. 4, 5, 7, and 8), the mounting body 74 defines a leg 80 extending forward from the stud mounting bracket 10 (e.g., front face 56 of bar 14) and a stud mounting flange 82 extending laterally from the leg and including openings 84 for receiving screws S for securing the stud mounting bracket 10 to the front mounting surface F1 of the wall stud WS. A length of the leg 80 generally corresponds to a depth of the junction box J being mounted on the stud mounting bracket 10. As described below and illustrated in FIGS. 1-8, the mounting extension 72 includes openings 84 in the mounting body 74 for receiving a fastener (e.g., screws S) to attach the stud mounting bracket 10 to the wall stud WS when the mounting extension is in a compact configuration. The mounting extension 72 includes openings 84 in the extension tab 78 for receiving a fastener (e.g., screws S) to attach the stud mounting bracket 10 to the wall stud WS when the mounting extension is in an extended configuration. When the mounting extension 72 is in one of the mounting configurations and the stud mounting bracket 10 is secured to the wall stud WS (e.g., the stud mounting bracket is secured to the front mounting surface F1 of the wall stud WS), a front face of the junction box J attached to the stud mounting bracket or the front face of the box plate BP attached to the junction box J may be coplanar with (lie within the plane) or disposed rearward of the plane defined by the front mounting surface F1 of the wall stud WS.

Figure 4:
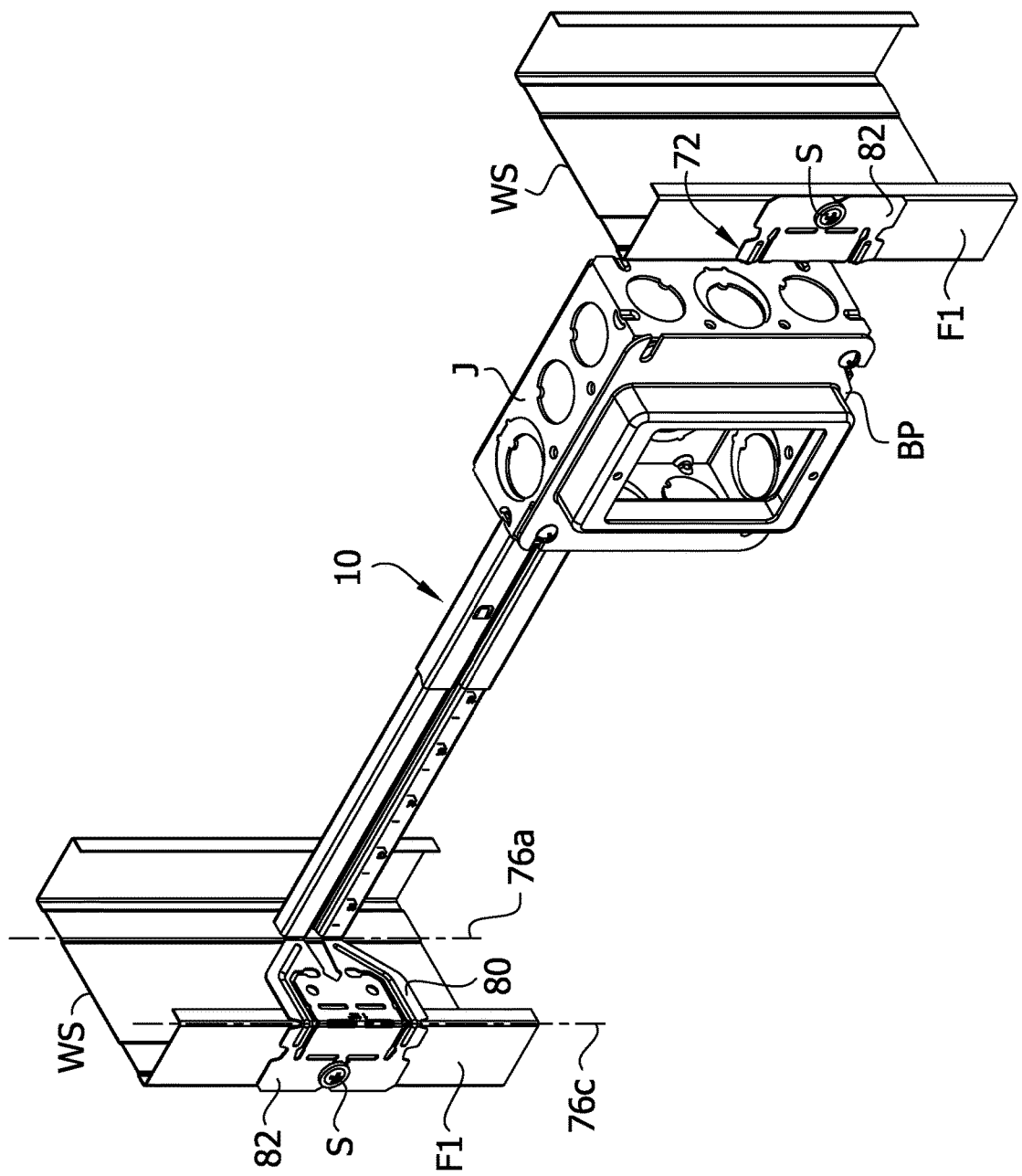
FIG. 4 is a perspective of a stud mounting bracket assembly including the stud mounting bracket, a junction box, and a box plate, illustrating the stud mounting bracket assembly attached to spaced wall studs and the stud mounting bracket in a first mounting configuration.

FIG. 4 illustrates a first mounting configuration, suitable for use with a junction box J having a first depth, for example a 4×4 in junction box J having a depth of 1½ in. In this first mounting configuration, the mounting body 74 is bent forward about the bending axis 76a at the left end margin 52 of the main body 46 such that the mounting body extends generally perpendicular to the front face 56, thereby forming the leg 80. The mounting body 74 and the extension tab 78 are also bent together about the bending axis 76c to form the stud mounting flange 82 extending laterally outward and generally perpendicular to the leg 80. The bending axis 76c for use with a junction box having a depth of 1½ in can be marked with indicia including numbers corresponding to the junction box depth and/or other indicia identifying the bending areas to inform a user of the proper mounting configuration. The screw S passes through the fastener opening 84 and into the stud WS to secure the bracket 10 to the stud.

Figure 5:
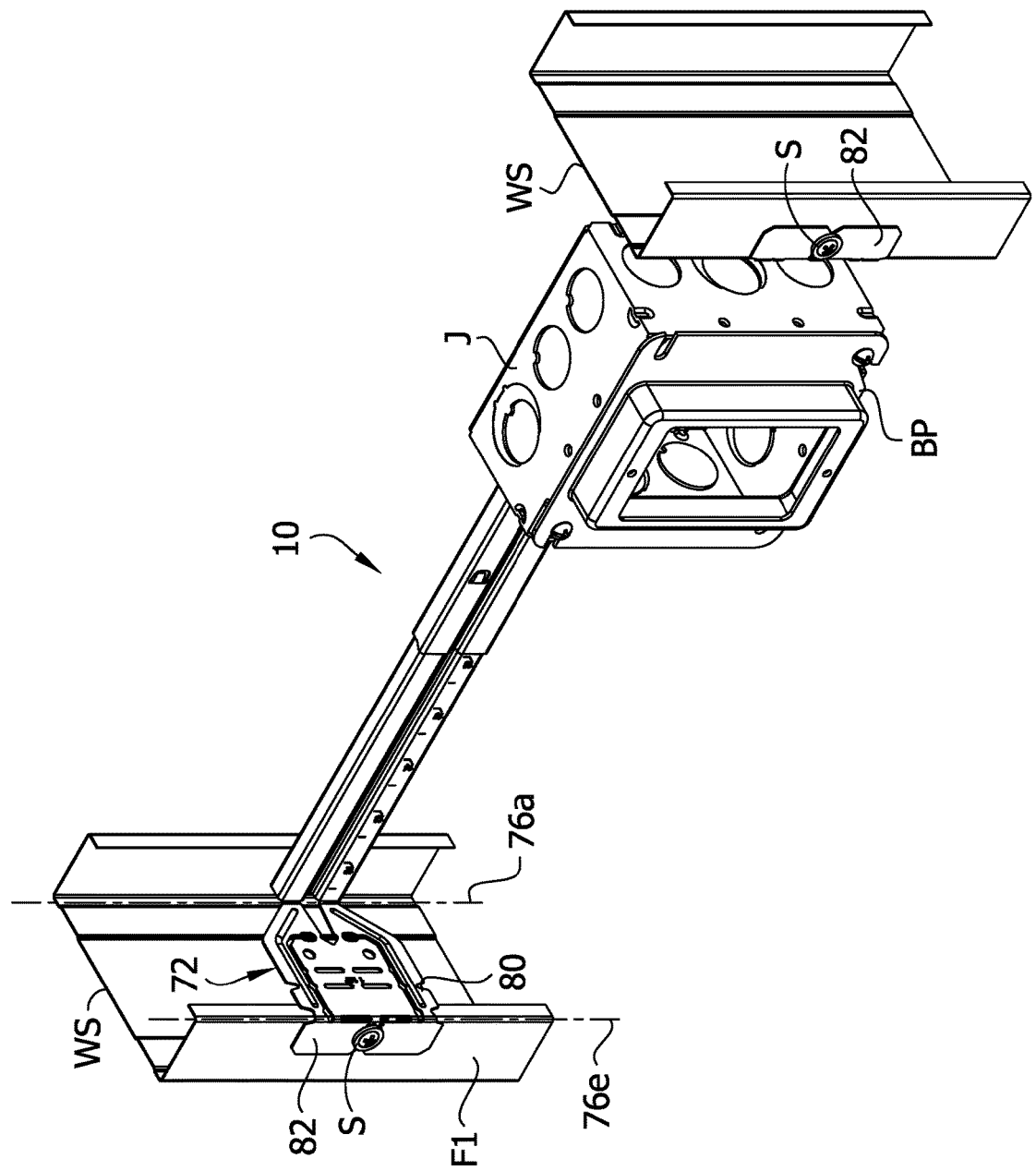
FIG. 5 is a perspective of a stud mounting bracket assembly including the stud mounting bracket, a junction box, and a box plate, illustrating the stud mounting bracket assembly attached to spaced wall studs and the stud mounting bracket in a second mounting configuration.

FIG. 5 illustrates a second mounting configuration of the mounting extension 72 suitable for use with a junction box J having a second depth, for example a 4$^{11}$/$_{16}$×4$^{11}$/$_{16}$ in junction box J having a depth of 2⅛ in. The mounting body 74 is bent forward about the bending axis 76a at the left end margin 52 of the main body 46 such that the mounting body extends generally perpendicular to the front face 56, thereby forming the leg 80. The mounting body 74 is then bent about the bending axis 76e to form the stud mounting flange 82 extending laterally outward and generally perpendicular to the leg 80. The bending axis 76e for use with a junction box having a depth of 2⅛ in be marked with indicia including numbers corresponding to the junction box depth and/or other indicia identifying the bending areas to inform a user of the proper mounting configuration. The screw S passes through the fastener opening 84 and into the stud WS to secure the bracket 10 to the stud.

Figure 6:
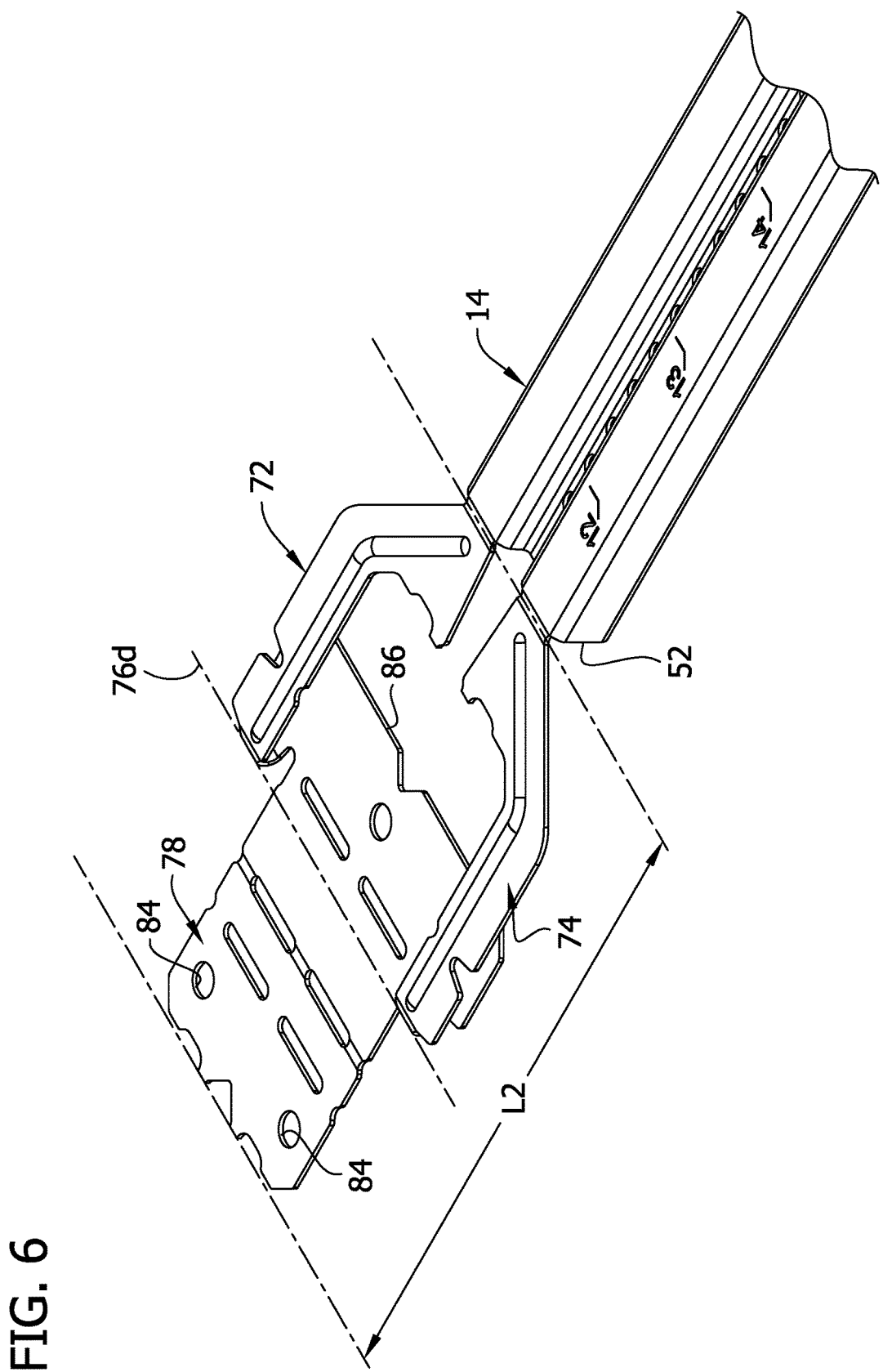
FIG. 6 is an enlarged partial view of the stud mounting bracket of FIG. 1, illustrating an extended configuration of the stud mounting bracket.

By using the extension tab 78, for example, the mounting extension 72 is also configured to accommodate larger junction box depths without adding additional material to the end of the mounting extension. Referring to FIGS. 3 and 6, in an initial or compact configuration, the mounting extension 72 has an initial length L1, measured from the side edge margin of the stud mounting bracket 10 (e.g., from the left end margin 52 of the main body 46 of bar 14) to a free end 86 of the mounting extension. In the compact configuration, a free end of the extension tab 78 is positioned closer to the side edge margin of the main body than a free end of the mounting body 74. The mounting extension 72, for example the mounting body 74, can be bent back on itself about the bending axis 76d such that the extension tab 78 extends longitudinally outward from the mounting body, thereby increasing the length of the mounting extension to an extended length L2, which is greater than the initial length L1. The extension tab 78 is pivoted relative to the mounting body 74 about the bending or pivoting axis 76d to extend the length of the mounting extension 72. In the extended configuration, the extension tab 78 extends laterally beyond the mounting body 74. In the extended configuration, the free end of the mounting body 74 is positioned closer to the side edge margin of the main body than the free end of the extension tab 78. In the illustrated embodiment, portions of the mounting extension 72 must first be cut at locations 88, 90 to free an end margin of the extension tab 78 and allow the extension tab to rotate or pivot outward from the mounting body as the mounting body is folded on itself about the axis 76d. Specifically, a free end of the extension tab 78 opposite the pivoting axis 76d is removably attached to the mounting body 74. It is understood that other configurations are within the scope of the present invention. For example, the mounting extension 72 can be free of material at locations 88, 90 (i.e., the free end of the extension tab 78 is not initially attached to the mounting body 74), such that the extension tab is free to extend the length of the mounting extension without requiring any cutting.

Figure 7:
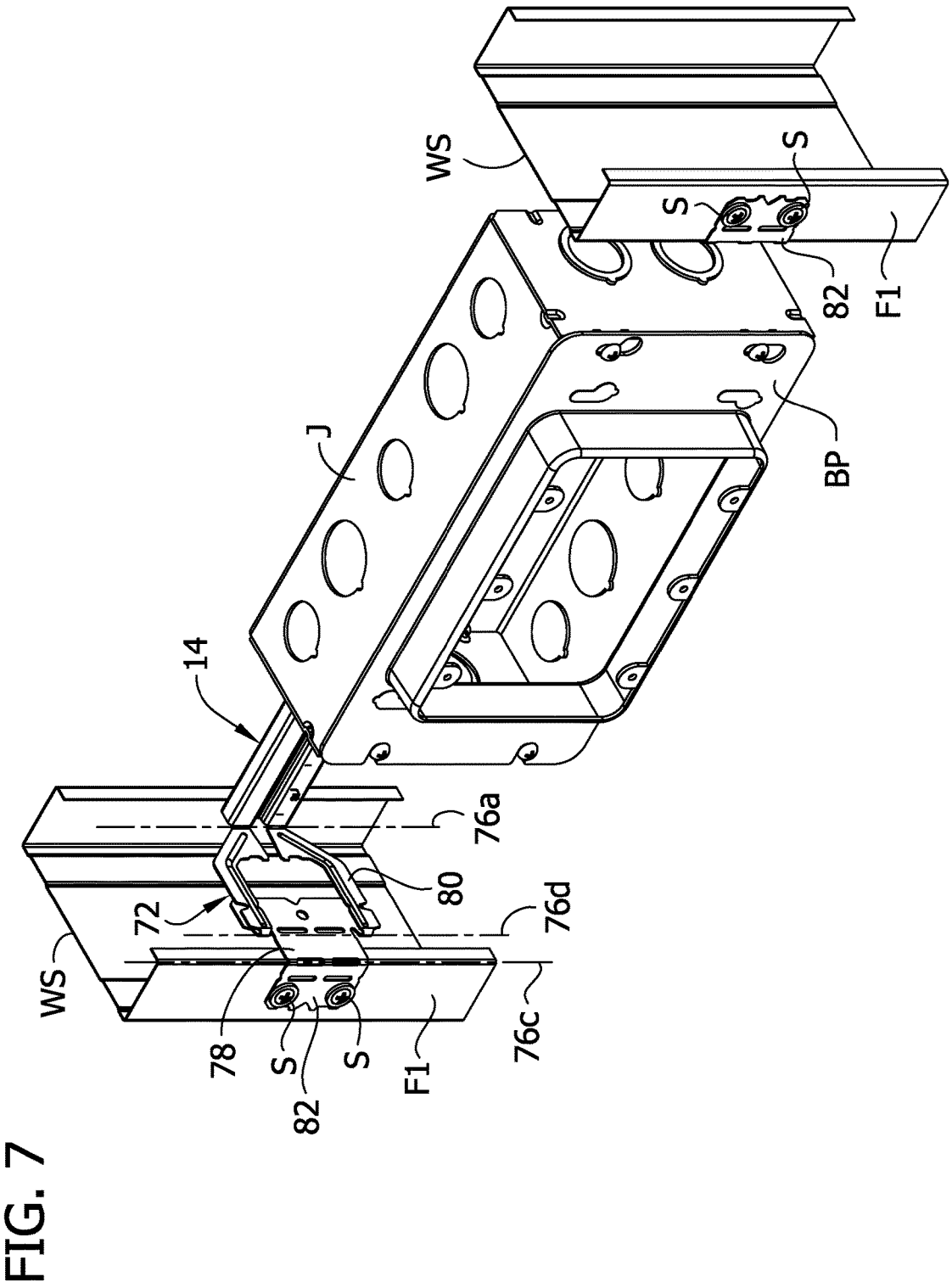
FIG. 7 is a perspective of a stud mounting bracket assembly including the stud mounting bracket, a junction box, and a box plate, illustrating the stud mounting bracket assembly attached to spaced wall studs and the stud mounting bracket in a third mounting configuration.

FIG. 7 illustrates a third mounting configuration of the mounting extension 72 suitable for use with a junction box J having a third depth, for example a multi-gang junction box J having a depth of 2½ in. If necessary, portions of the mounting extension 72 are cut at locations 88, 90 to free the extension tab 78 for bending to extend the length of the mounting extension 72. The mounting body 74 is bent back on itself about the bending axis 76d such that the extension tab 78 rotates or pivots outward from the mounting body and extends the length of the mounting extension 72. The mounting body 74 is bent forward about the bending axis 76a at the left edge margin 52 of the main body 46 such that the mounting body and at least a portion of the extension tab extends generally perpendicular to the front face 56, thereby forming the leg 80. The extension tab 78 is bent about the bending axis 76c to form the stud mounting flange 82 extending laterally outward from and generally perpendicular to the leg 80. The bending axes 76d and 76c for use with a junction box having a depth of 2½ in can be marked with indicia including numbers corresponding to the junction box depth and/or other indicia identifying the bending areas to inform a user of the proper mounting configuration. One or more screws S (e.g., two screws) passes through one or more fastener openings 84 of the extension tab 78 and into the stud WS to secure the bracket 10 to the stud.

Figure 8:
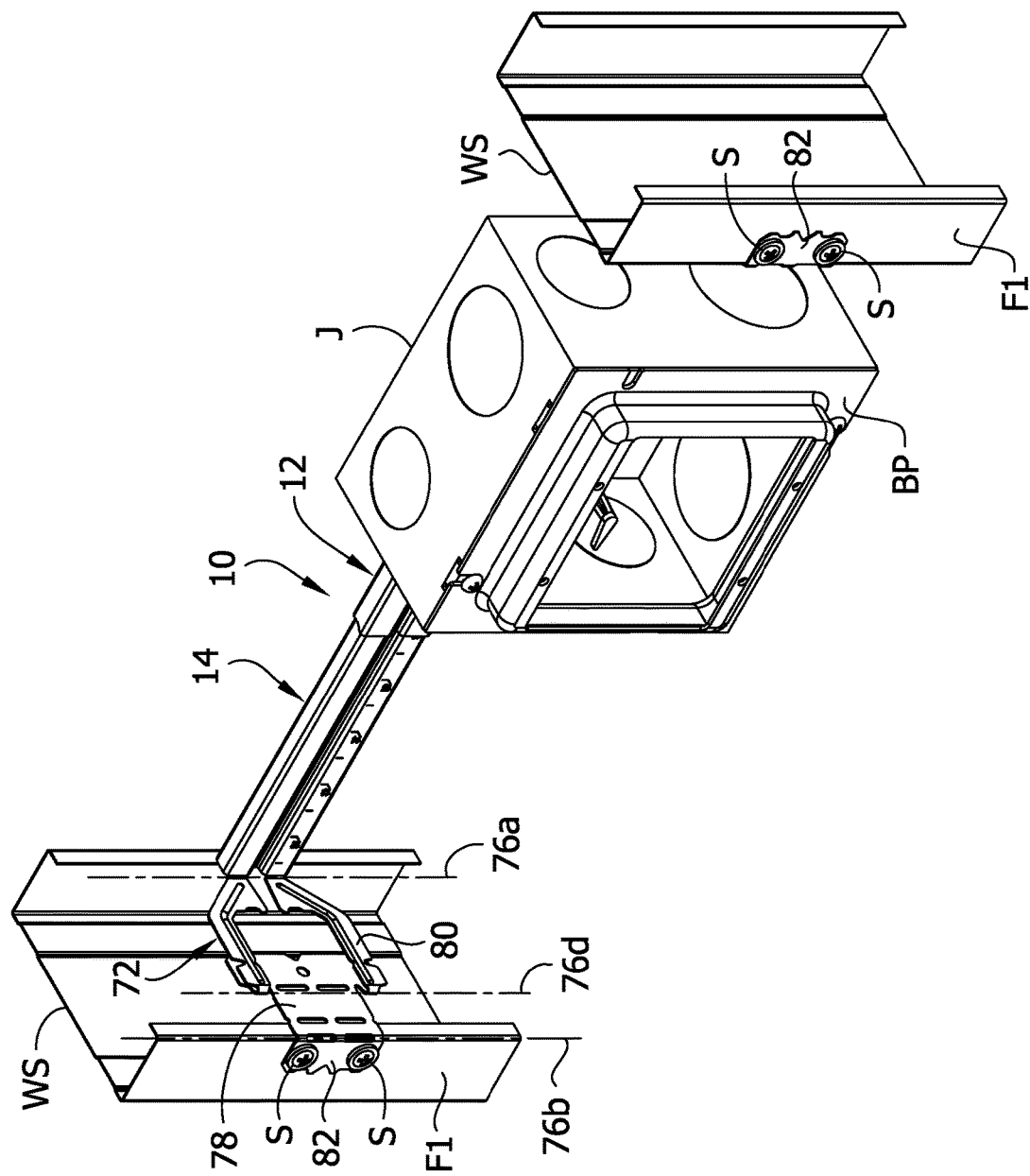
FIG. 8 is a perspective of a stud mounting bracket assembly including the stud mounting bracket, a junction box, and a box plate, illustrating the stud mounting bracket assembly attached to spaced wall studs and the stud mounting bracket in a fourth mounting configuration.

FIG. 8 illustrates another mounting configuration of the mounting extension 72 suitable for use with a junction box J having a fourth depth, for example a 5×5 in junction box J having a depth of 2$^{13}$/$_{16}$ in. If necessary, the mounting extension 72 is cut at locations 88, 90 to free the extension tab 78 for bending to extend the length of the mounting extension 72. The mounting body 74 is bent back on itself about the bending axis 76d such that the extension tab 78 rotates or pivots outward from the mounting body and extends the length of the mounting extension 72. The mounting body 74 is bent forward about the bending axis 76a at the left edge margin 52 of the main body 46 such that the mounting body extends generally perpendicular to the front face 56, thereby forming the leg 80. The extension tab 78 is bent about the bending axis 76b to form the stud mounting flange 82 extending laterally outward from and generally perpendicular to the leg 80. The bending axes 76d and 76b for use with a junction box having a depth of 2$^{13}$/$_{16}$ in can be marked with indicia including numbers corresponding to the junction box depth and/or other indicia identifying the bending areas to inform a user of the proper mounting configuration. One or more screws S (e.g., two screws) passes through one or more fastener openings 84 of the extension tab 78 and into the stud WS to secure the bracket 10 to the stud.

As can be seen from the above disclosure and FIGS. 1-8, the mounting extension 72 of the stud mounting bracket 10 can be configured in a plurality of mounting configurations for use with the typical junction boxes J having depths of 1½ in, 2⅛ in, 2½ in, and 2¹³⁄₁₆ in, thereby eliminating the need for a number of stud mounting brackets of different depths. Moreover, as disclosed above, the mounting extension is configurable to an extended length greater than an initial length for accommodating larger depth junction boxes without requiring additional material be added to the end of the mounting extension. The mounting extension 72 as described above can be used with different stud mounting brackets other than the described telescoping bracket within the scope of the present invention. For example, a fixed length stud mounting bracket can include a mounting extension 72 on one or both ends thereof. Other configurations are within the scope of the present invention.

FIGS. 9-12 illustrate alternate embodiments for the mounting extension 72. Corresponding reference numbers are used to refer to corresponding elements. Where elements are substantially similar to the embodiments described above, they will not be described in detail again below.

Figure 9:
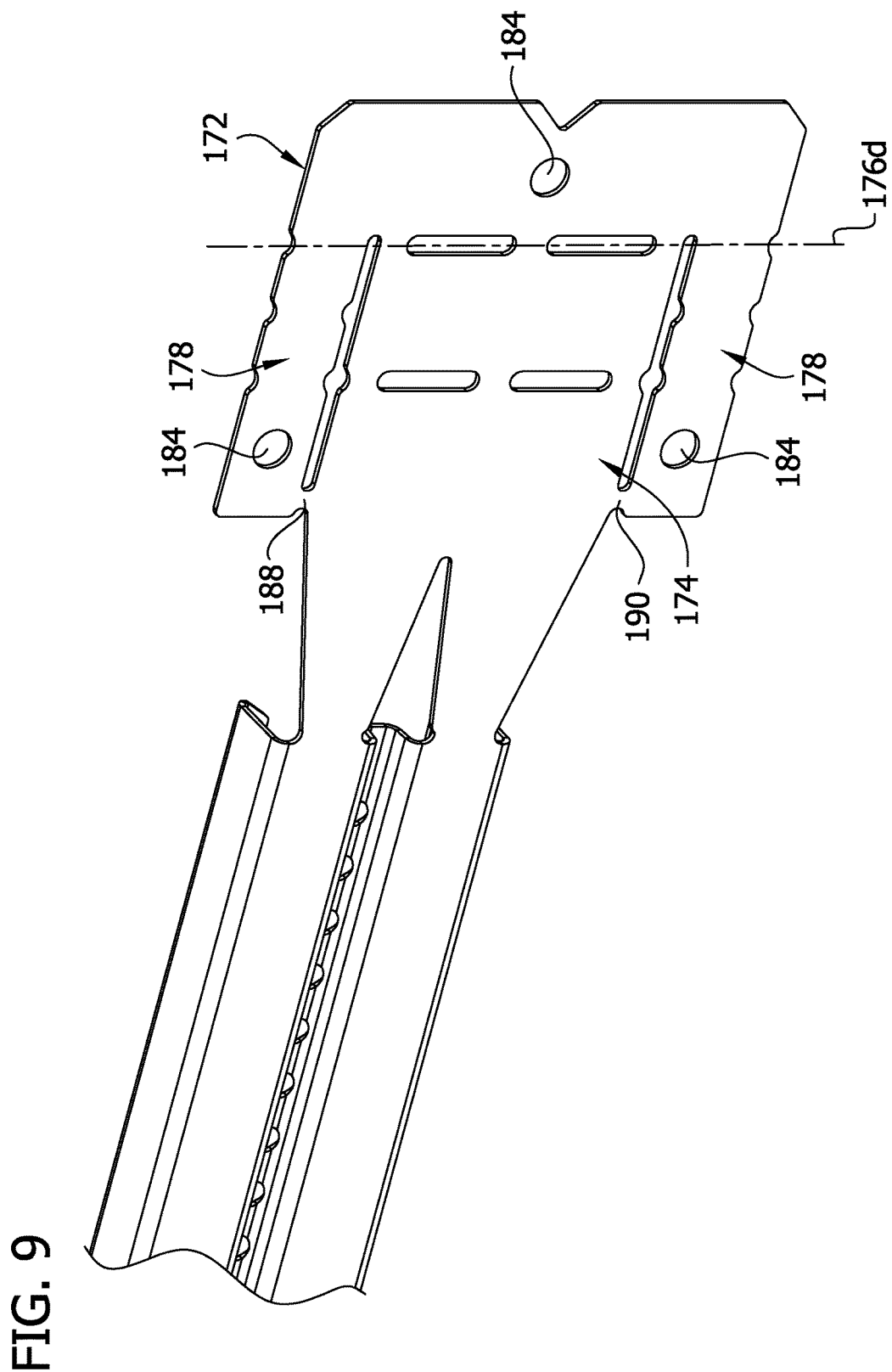
FIG. 9 is an enlarged, partial view of a second embodiment of a mounting extension of the stud mounting bracket, illustrating the mounting extension in an initial configuration.
Figure 10:
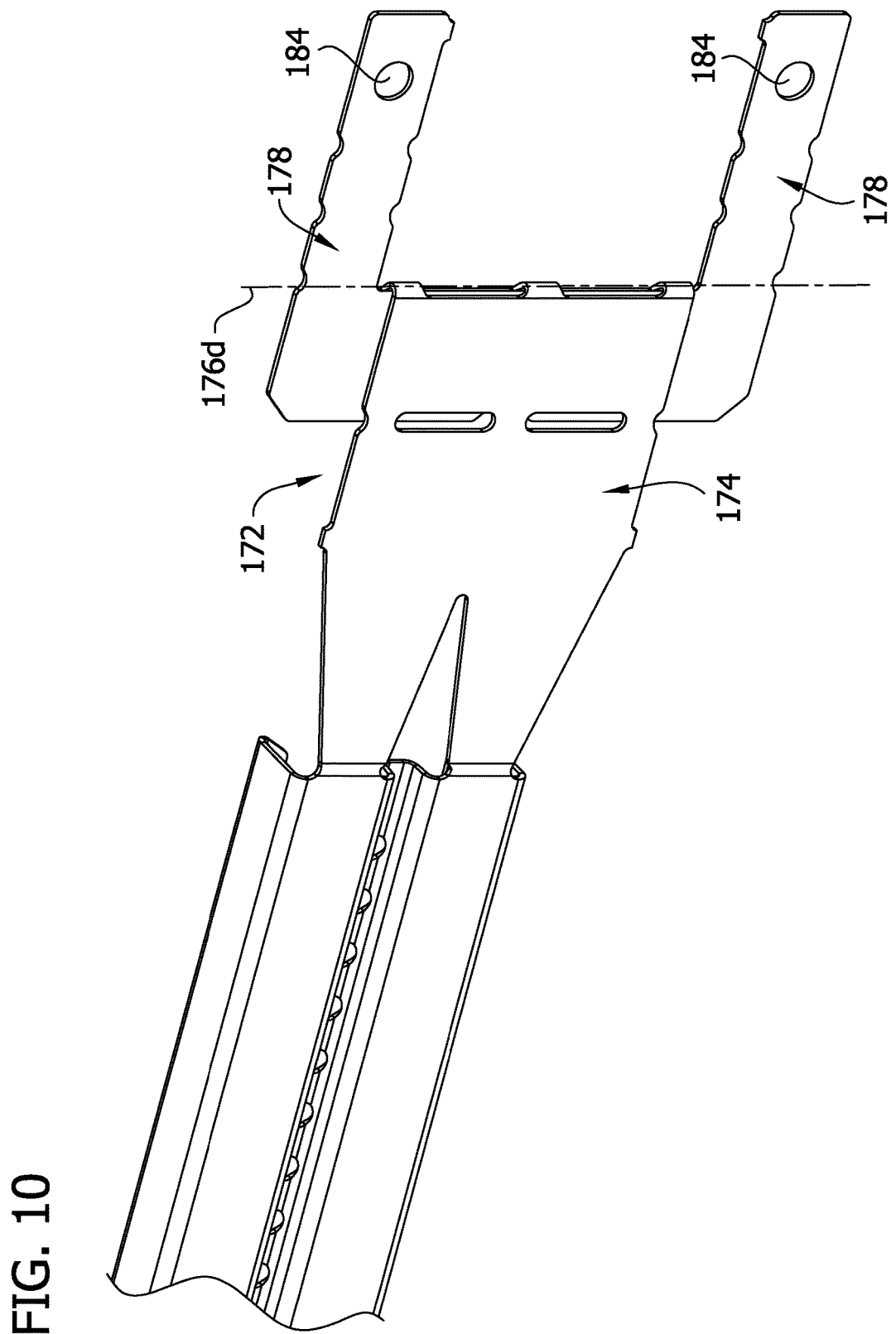
FIG. 10 is an enlarged, partial view of the mounting extension of FIG. 9, illustrating the mounting extension in an extended configuration.

In the embodiment of FIGS. 9 and 10, the mounting extension 172 includes two extension tabs 178 positioned on the outside of the mounting body 174. In this embodiment, an interior section of the mounting extension 172 comprises the mounting body 174. An exterior section of the mounting extension 172 comprises the extension tab 178. The extension tabs 178 are attached to the mounting body 174 at a bending or pivoting axis 176d. The extension tabs 178 can also be removably attached to the mounting body 174 at a free end opposite the pivoting axis 176d. The mounting extension 172 can be cut at locations 188, 190 to free the extension tabs 178. The mounting body 174 can then be bent back on itself about bending axis 176d to rotate the extension tabs 178 such that the extension tabs extend longitudinally outward from the mounting body, thereby extending the length of the mounting extension 172. Screws are inserted through one or more of the openings 184 to fasten the mounting extension to the wall stud. The method of configuring a stud mounting bracket including the mounting extensions 172 for use with boxes of various sizes is similar to the method set forth above with respect to the first embodiment.

Figure 11:
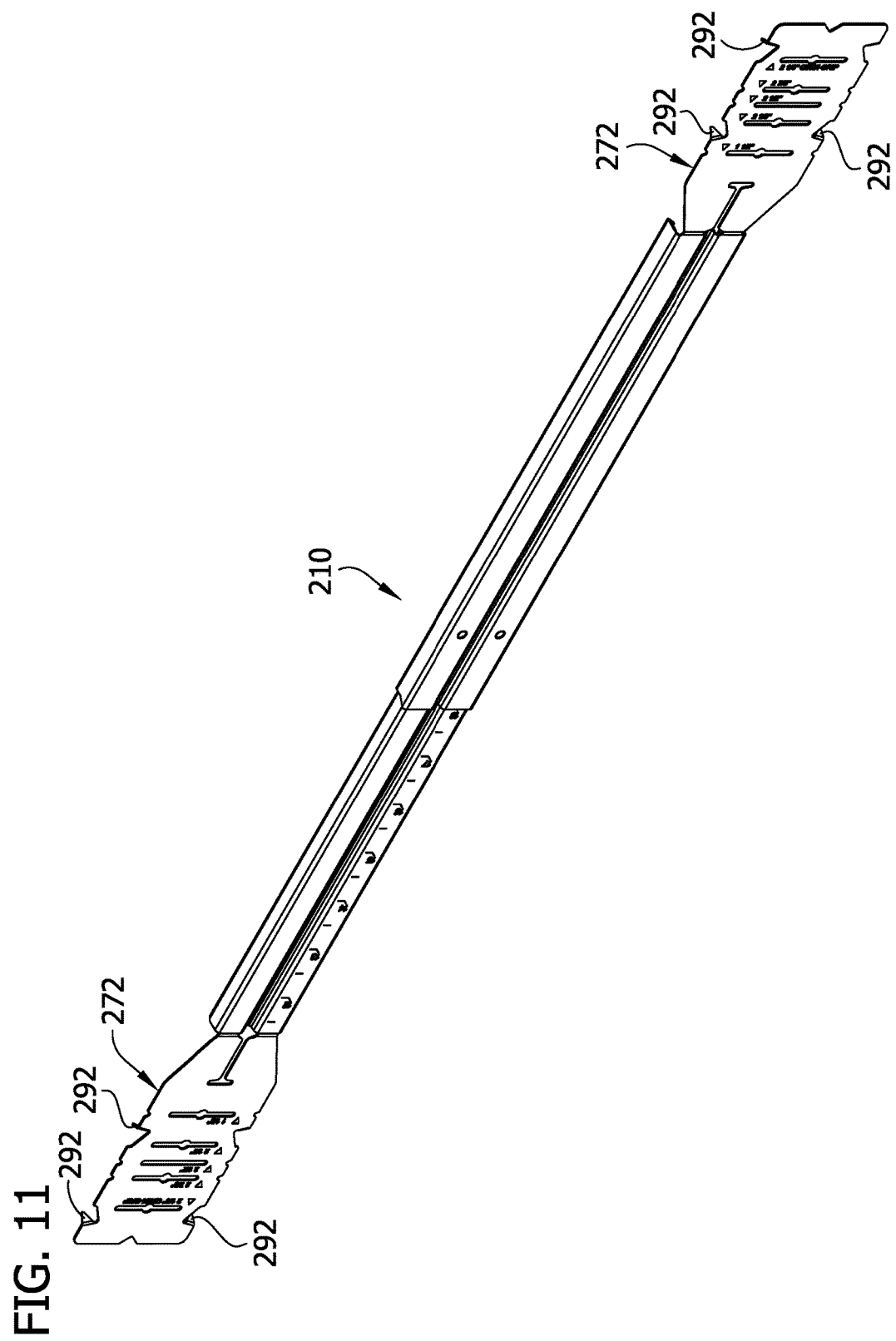
FIG. 11 is a perspective of a stud mounting bracket according to another embodiment, illustrating barbs on mounting extensions of the stud mounting bracket.
Figure 12:
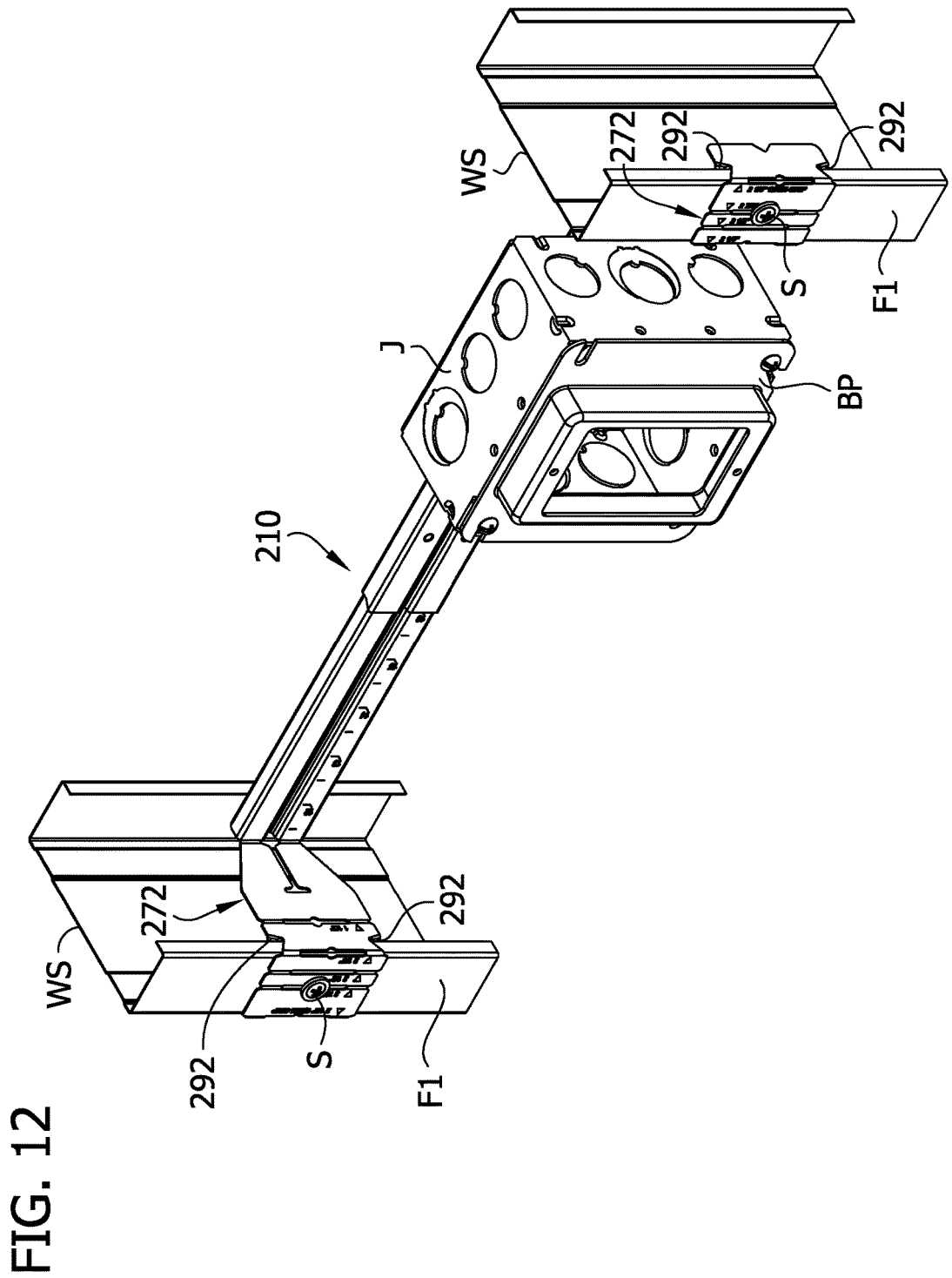
FIG. 12 is a perspective of a stud mounting bracket assembly including the stud mounting bracket of FIG. 11, a junction box, and a box plate, illustrating the stud mounting bracket assembly attached to spaced wall studs and the stud mounting bracket in a mounting configuration.
Figure 13:
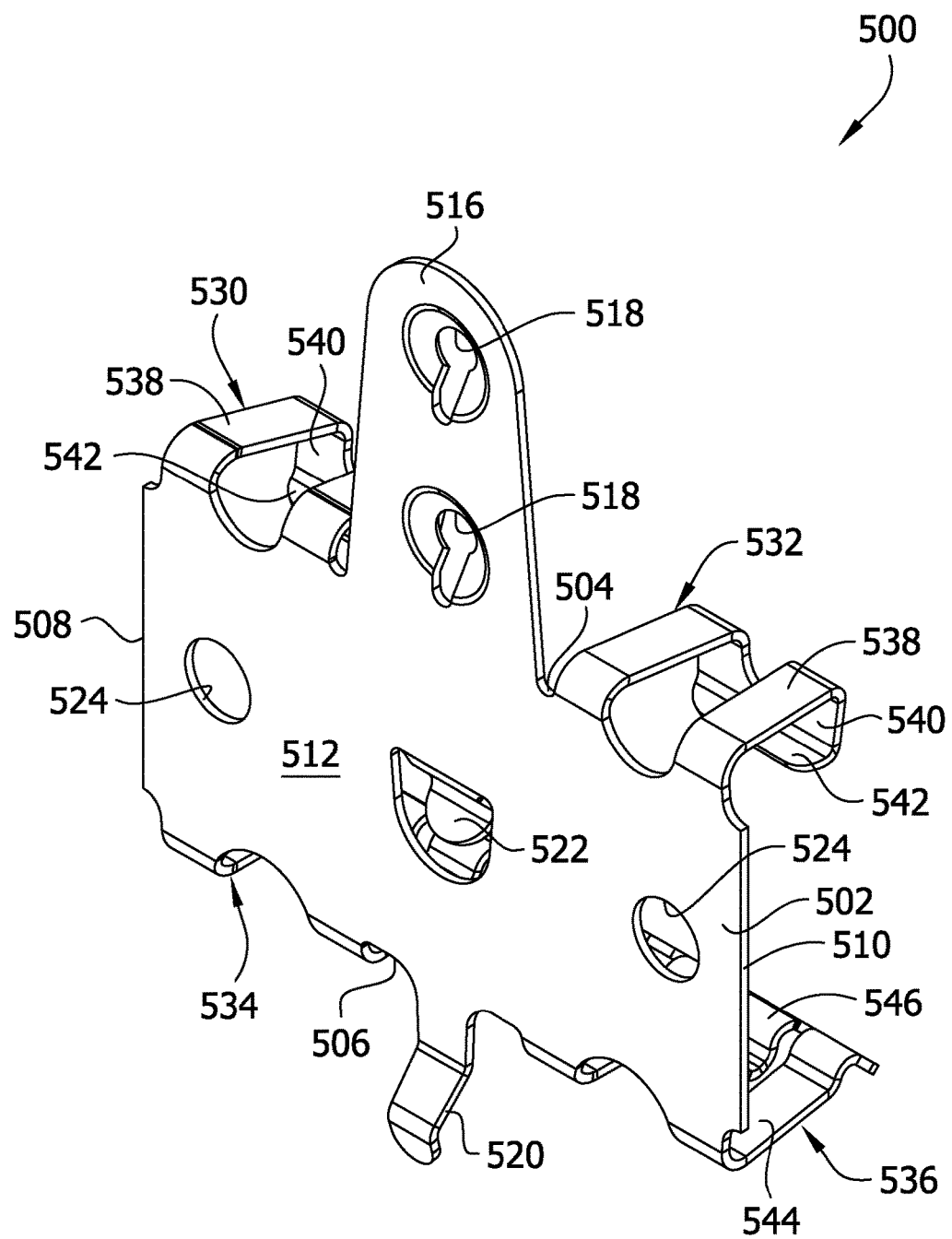
FIG. 13 is a perspective of a box mounting bracket for mounting a junction box on a stud mounting bracket.
Figure 14:
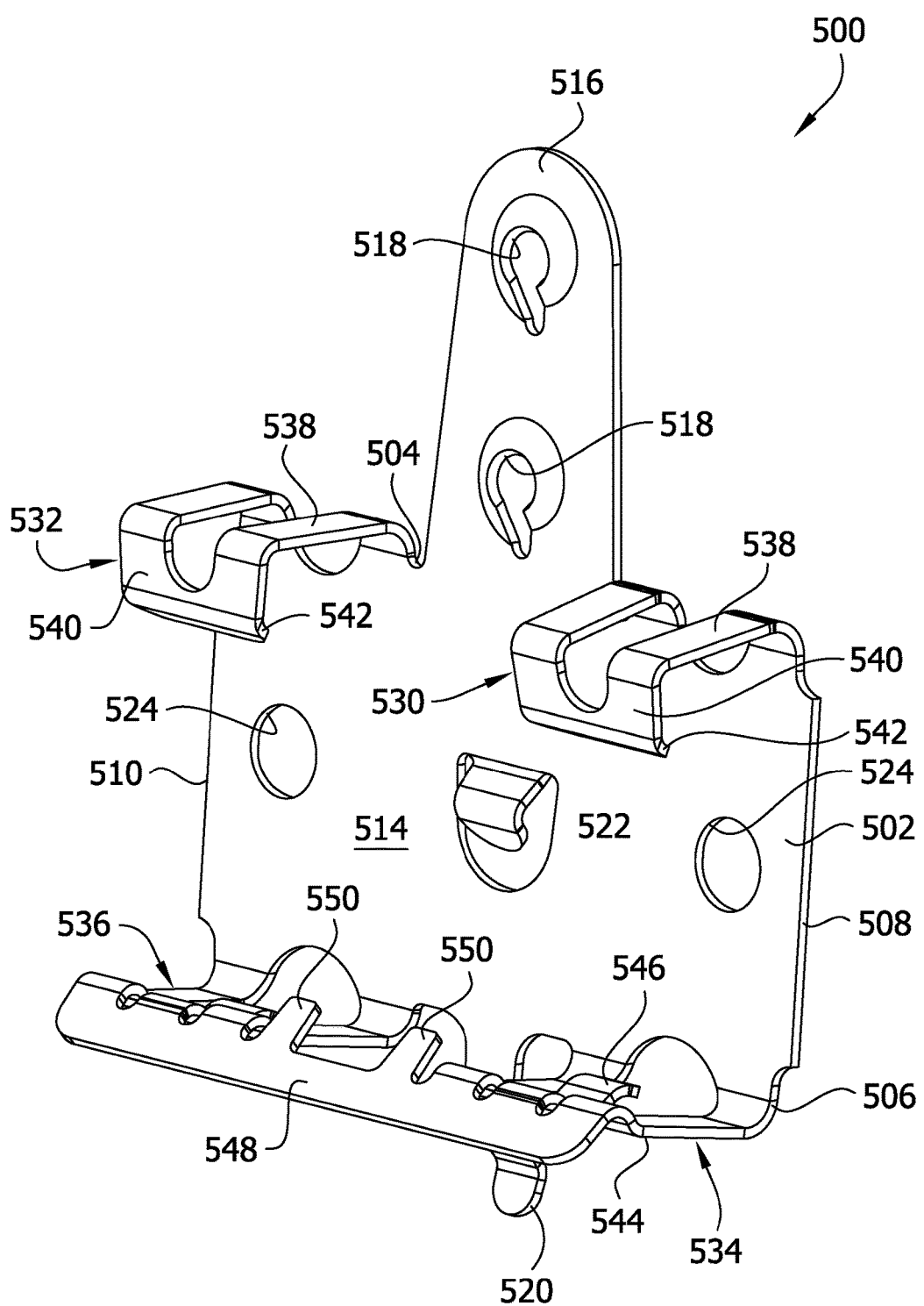
FIG. 14 is a rear perspective of the box mounting bracket of FIG. 13.
Figure 15:
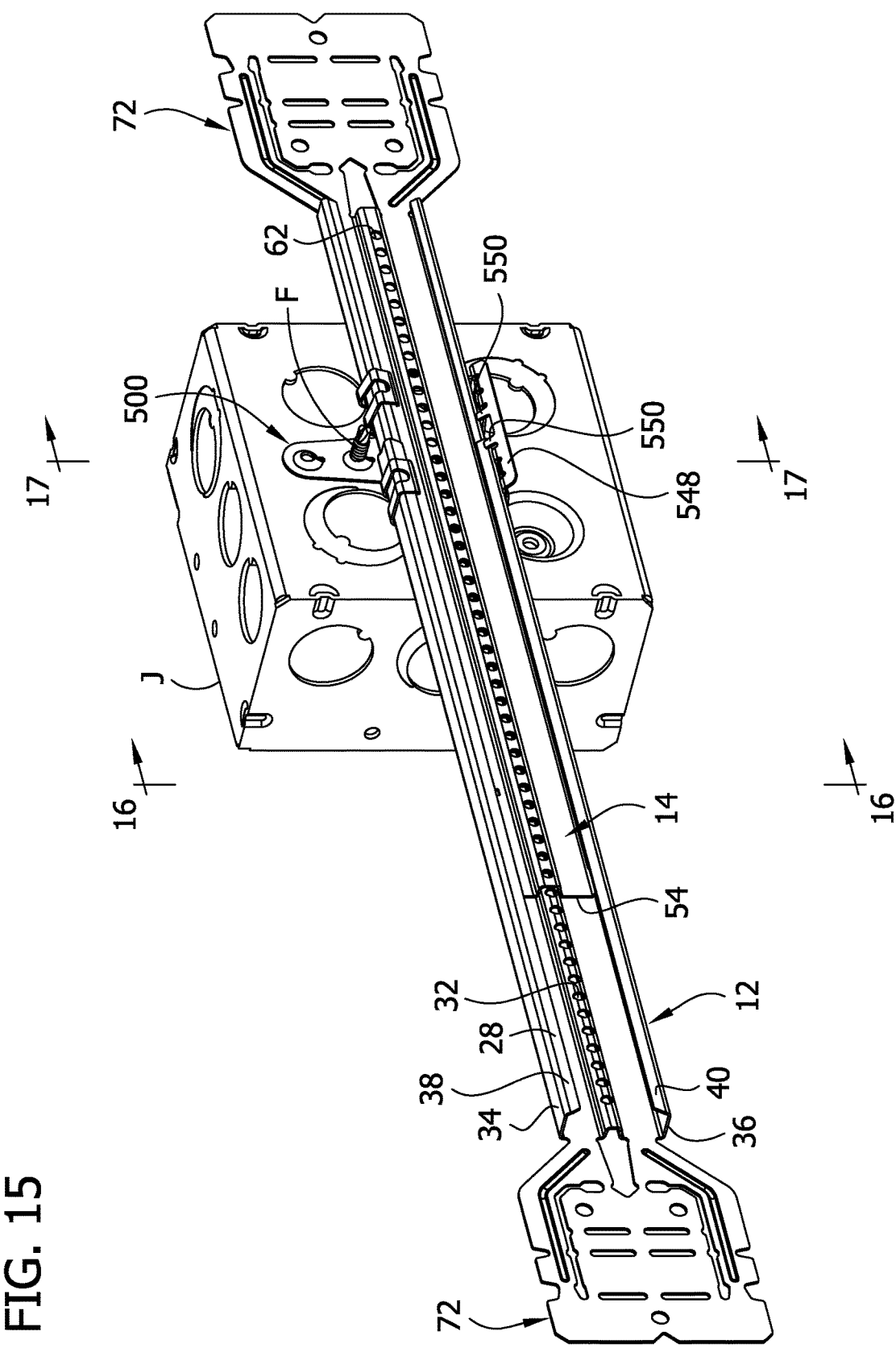
FIG. 15 is a rear perspective of a stud mounting bracket assembly including the stud mounting bracket of FIG. 1, the box mounting bracket of FIG. 13, and a junction box, illustrating the box mounting bracket mounting the junction box on the stud mounting bracket.
Figure 16:
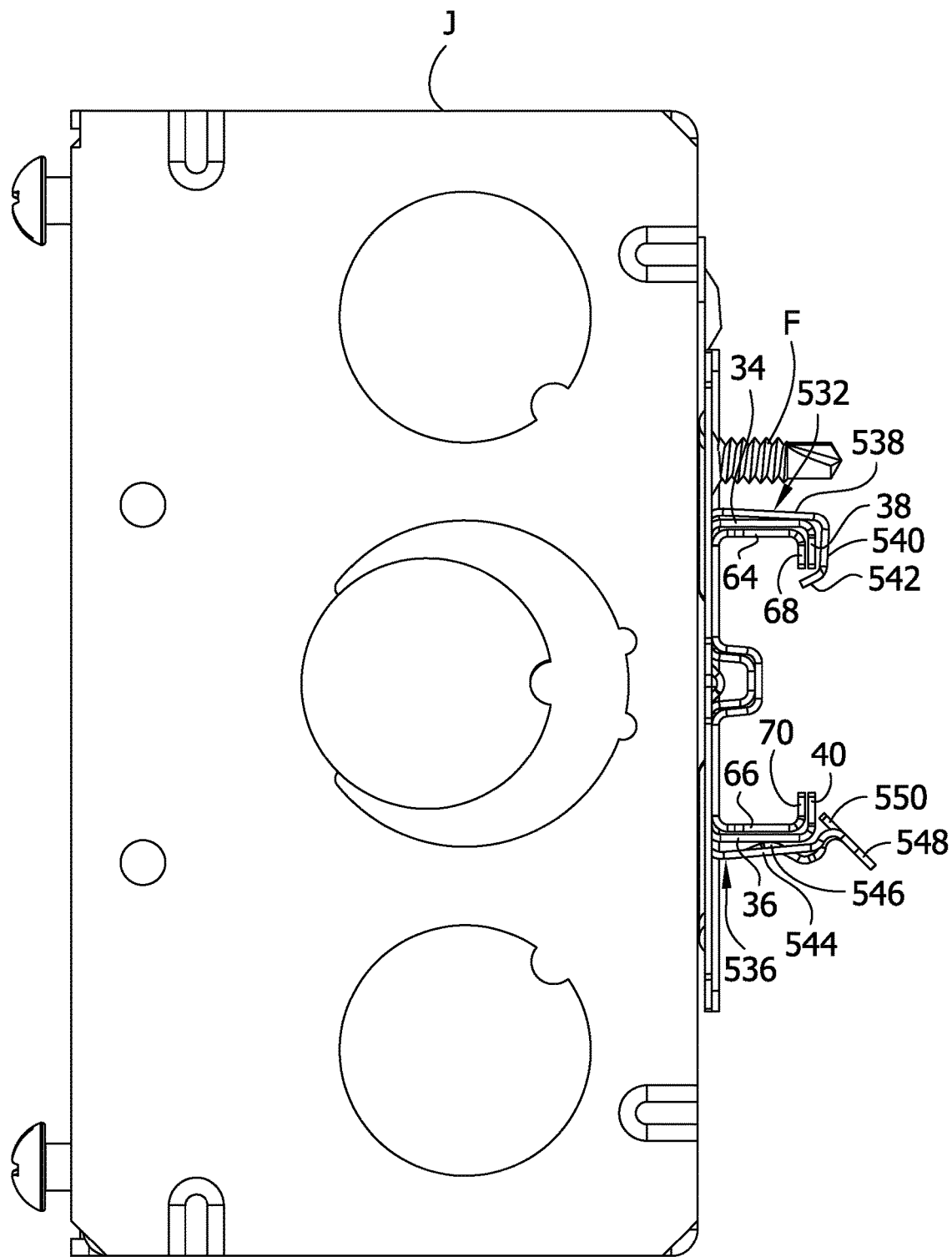
FIG. 16 is a section taken along line 16-16 of FIG. 15, illustrating the connection of the box mounting bracket to an outer bar of the stud mounting bracket.
Figure 17:
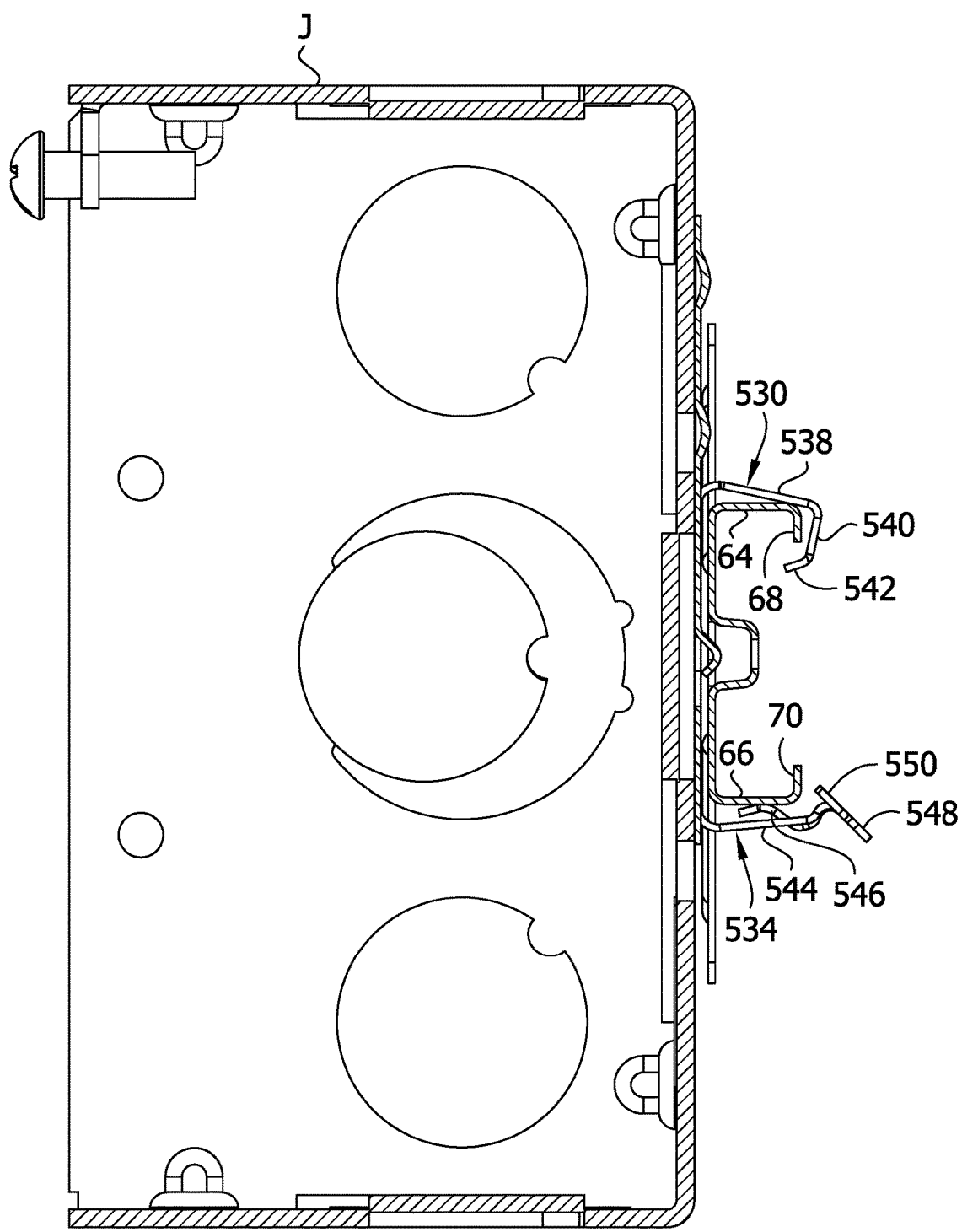
FIG. 17 is a section taken along line 17-17 of FIG. 15, illustrating the connection of the box mounting bracket to an inner bar of the stud mounting bracket.

In the embodiment of FIGS. 11 and 12, the mounting extension 272 includes barbs 292 for contacting the wall stud WS to hold the stud mounting bracket 210 in place on the wall stud until mounting screws S can be inserted through the opening 284 to fasten the stud mounting bracket to the wall stud.

FIGS. 13-17 illustrate an embodiment of a box mounting bracket 500 for use in attaching a junction box J to the stud mounting bracket 10. In this embodiment, the box mounting bracket 500 is a unitary, one-piece construction. The box mounting bracket 500 may be formed from a single sheet of metal (e.g., steel or aluminum) or other suitable material. In one embodiment, the box mounting bracket 500 is formed from spring steel. The box mounting bracket 500 includes a base 502 that is generally rectangular having opposite upper and lower edge margins 504, 506, opposite left and right edge margins 508, 510, a front face 512, and a rear face 514. An attachment tab 516 extends upward from the upper edge margin 504 and includes openings 518 for receiving a fastener F to attach a junction box J to the box mounting bracket 500. A tang 520 extends downward and forward from the lower edge margin 506. The tang 520 is inserted into an opening in the back wall of the junction box J when the junction box is attached to the box mounting bracket 500. A tang 522 extends rearward from the base 502 and extends into the channel 30, 60 of the stud mounting bracket 10 when the box mounting bracket 500 is attached to the stud mounting bracket. The base 502 also includes openings 524 for optionally receiving fasteners to attach the box mounting bracket 500 to the stud mounting bracket 10.

The box mounting bracket 500 includes first and second independently movable upper jaws 530, 532 and first and second independently movable lower jaws 534, 536. The jaws 530, 532, 534, 536 are configured to clip on to the telescoping bars 12, 14 of the stud mounting bracket 10. In the illustrated embodiment, each jaw 530, 532, 534, 536 can be resiliently deflected to clip onto the stud mounting bracket 10, independent of any resilient deflection of the other jaws. Because each jaw is independently movable, the box mounting bracket 500 can be positioned entirely on the outer telescoping bar 12, be positioned entirely on the inner telescoping bar 14, or straddle the outer and the inner bars (see FIG. 15).

Each upper jaw 530, 532 comprises an arm 538 extending rearward from the base 502 at the upper edge margin 504, a leg 540 extending downward from the arm, and a hook 542 extending forward from the leg. Each lower jaw 534, 536 comprises an outer arm 544 extending rearward from the base 502 at the lower edge margin 506 and an inner arm 546 extending forward from the outer arm. Optionally, the outer arms 544 of the lower jaws 534, 536 are connected by a connecting member 548, as illustrated. Alternatively, the lower jaws 534, 536 can be completely separate with no connecting member extending therebetween. Although the outer arms 544 of the lower jaws 534, 536 are connected by the connecting member 548 in the illustrated embodiment, the inner arms 546 are independently movable, thereby making the lower jaws independently movable relative to each other. A pair of tangs 550 extends generally upward and forward from the connecting member 548 between the outer arms 544 for inhibiting inadvertent removal of the box mounting bracket 500 from the stud mounting bracket 10, as will be described below.

When the box mounting bracket 500 is positioned on the outer bar 12 (FIG. 16) of the stud mounting bracket 10, the upper jaw 532 clips around the upper flange 34 of the bar. The hook 542 of the upper jaw 532 extends below the upper lip 38 of the telescoping bar 12. The lower jaw 536 engages the lower flange 36 of the bar 12 and clamps the bar between the upper jaw 530 and the lower jaw. The inner arm 546 of the lower jaw 536 flexes downward to accommodate the telescoping bar 12 and to clamp the bar between the upper and lower jaws. The upper jaw 532 and/or the lower jaw 536 (including the outer arm 544 and/or the inner arm 546) can resiliently deflect to accommodate the outer bar 12. If force is applied to the top of the box mounting bracket 500 (e.g., if the top of a junction box J attached to the box mounting bracket is contacted during installation of dry wall), the tangs 550 will contact the lip 40 of the telescoping bar 12 and prevent the box mounting bracket from coming off the bar. If force is applied to the bottom of the box mounting bracket 500 (e.g., if the bottom of a junction box J attached to the box mounting bracket is contacted during installation of dry wall), the hook 542 will contact the lip 38 of the bar 12 and prevent the box mounting bracket from coming off the bar. Thus, once the box mounting bracket 500 is positioned on the stud mounting bracket 10, inadvertent removal due to forces acting on the box mounting bracket is prevented. In order to remove the box mounting bracket 500, a tool (e.g., a screwdriver) can be inserted between the connecting member 548 and the telescoping bar 12 to pry the box mounting bracket off the bar.

When the box mounting bracket 500 is positioned on the inner telescoping bar 14 (FIG. 17), the upper jaw 530 clips around the upper flange 64 of the bar. The hook 542 of the upper jaw 530 extends below the upper lip 68 of the telescoping bar 14. The lower jaw 534 engages the lower flange 66 of the bar 14 and clamps the bar between the upper jaw 532 and the lower jaw. The inner arm 546 of the lower jaw 534 flexes downward to accommodate the telescoping bar 14 and to clamp the bar between the upper and lower jaws. The upper jaw 530 and/or the lower jaw 534 (including the outer arm 544 and/or the inner arm 546) can resiliently deflect to accommodate the outer bar 12. If force is applied to the top of the box mounting bracket 500 (e.g., if the top of a junction box J attached to the box mounting bracket is contacted during installation of dry wall), the tangs 550 will contact the lip 70 of the telescoping bar 14 and prevent the box mounting bracket from coming off the bar. If force is applied to the bottom of the box mounting bracket 500 (e.g., if the bottom of a junction box J attached to the box mounting bracket is contacted during installation of dry wall), the hook 542 will contact the lip 68 of the bar 14 and prevent the box mounting bracket from coming off the bar. Thus, once the box mounting bracket 500 is positioned on the stud mounting bracket 10, inadvertent removal due to forces acting on the box mounting bracket is prevented. In order to remove the box mounting bracket 500, a tool (e.g., a screwdriver) can be inserted between the connecting member 548 and the telescoping bar 14 to pry the box mounting bracket off the bar.

Because the upper jaws 530, 532 are independently movable relative to each other and the lower jaws 534, 536 are independently movable relative to each other, the box mounting bracket 500 can be positioned at any location along the stud mounting bracket 10. If the box mounting bracket 500 is positioned partially on the outer bar 12 and partially on the inner bar 14, the jaws positioned on the outer bar engage the bracket as described above with reference to jaws 532, 536 (FIG. 16), and the jaws positioned on the inner bar engage the bracket as described above with reference to jaws 530, 534 (FIG. 17). Other configurations including independently movable upper and lower jaws are within the scope of the present invention. For example, the upper and lower jaws can have the same construction (e.g., both the upper and lower jaws can be configured as the upper jaws described above, or both the upper and lower jaws can be configured as the lower jaws described above). Alternatively, only one side of the box mounting bracket (the upper side or the lower side) may include independently movable jaws.

The stud mounting bracket 10 can be sold and shipped to customers separately or as part of an assembly, such as a pre-assembled electrical unit, or as part of a kit. Likewise, the box mounting bracket 500 can be sold and shipped to customers separately or as part of an assembly, such as a pre-assembled electrical unit, or as part of a kit. In one embodiment, a stud mounting bracket assembly includes the stud mounting bracket 10 as described above, the box mounting bracket 500 as described above, and a junction box J for attachment to the stud mounting bracket. The junction box J can be attached to the stud mounting bracket as-sold with the stud mounting bracket either in the initial configuration (FIGS. 1 and 2) or in a mounting configuration for use with the junction box. Alternatively, the stud mounting bracket 10, box mounting bracket 500, and junction box J can be sold together as a kit for assembly by the user. In another embodiment, the stud mounting bracket 10, junction box J, and box plate BP can be sold together, either assembled or disassembled. In yet another embodiment, a stud mounting bracket assembly includes the stud mounting bracket 10 and the box mounting bracket 500. The stud mounting bracket and box mounting bracket can be sold assembled or disassembled. In any of the above embodiments, the assembly can further include additional junction boxes J and box plates BP. Other configurations and assemblies are within the scope of the present invention.

The stud mounting brackets as described above are versatile and permit a user to use the bracket with various size junction boxes. The stud mounting brackets as described eliminate the need for different depths of stud mounting bracket based on junction box size, while not requiring any additional material that would add to the cost of the stud mounting bracket. The box mounting bracket as described above is versatile and permits a user to attach the box mounting bracket at any location along the stud mounting bracket. The box mounting bracket also prevents inadvertent removal of the box mounting bracket due to forces applied during construction or installation.

Having described embodiments of the invention in detail, it will be apparent that modifications and variations are possible without departing from the scope of the invention defined in the appended claims.

When introducing elements of the illustrated embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A box mounting bracket for mounting a junction box on a stud mounting bracket, the box mounting bracket comprising:
   a base having a front face, a rear face, an upper edge margin and a lower edge margin, the base constructed for attaching a junction box to the front face thereof;
   a first upper jaw extending rearward from the upper edge margin of the base, the first upper jaw configured to engage the stud mounting bracket for use in attaching the box mounting bracket to the stud mounting bracket; and
   a second upper jaw extending rearward from the upper edge margin of the base, the second upper jaw configured to engage the stud mounting bracket for use in attaching the box mounting bracket to the stud mounting bracket,
   a first lower jaw extending rearward from the lower edge margin of the base, the first lower jaw being resiliently deflectable both relative to the base and independent of each of the first and second upper jaws when attaching the box mounting bracket to the stud mounting bracket,
   wherein the first and second upper jaws are resiliently deflectable both relative to the base and independent of one another when attaching the box mounting bracket to the stud mounting bracket,
   wherein the first lower jaw comprises an outer jaw arm and an inner jaw arm, the outer and inner jaw arms being resiliently deflectable both relative to the base and independent of one another.

2. The box mounting bracket as recited in claim 1, wherein each of the first and second upper jaws comprises a hook configured to prevent inadvertent removal of the box mounting bracket from the stud mounting bracket.

3. The box mounting bracket as recited in claim 1, further comprising a tang extending from the first lower jaw and configured to prevent inadvertent removal of the box mounting bracket from the stud mounting bracket.

4. The box mounting bracket as recited in claim 1, further comprising a second lower jaw extending rearward from the lower edge margin of the base, the second lower jaw being resiliently deflectable both relative to the base and independent of each of the first upper jaw, the second upper jaw, and the first lower jaw when attaching the box mounting bracket to the stud mounting bracket.

5. The box mounting bracket as recited in claim 4, further comprising a tang extending from each of the first and second lower jaws and configured to prevent inadvertent removal of the box mounting bracket from the stud mounting bracket.

6. The box mounting bracket as recited in claim 4, wherein second lower jaw comprises an outer jaw arm and an inner jaw arm, the outer and inner jaw arms of the second lower jaw being resiliently deflectable both relative to the base and independent of one another.

7. The box mounting bracket as recited in claim 6, further comprising a connecting member interconnecting the outer arms of the first and second lower jaws.

8. A box mounting bracket for mounting a junction box on a stud mounting bracket, the box mounting bracket comprising:
   a base having a front face, a rear face, an upper edge margin and a lower edge margin, the base constructed for attaching a junction box to the front face thereof;
   a first upper jaw extending rearward from the upper edge margin of the base, the first upper jaw configured to engage the stud mounting bracket for use in attaching the box mounting bracket to the stud mounting bracket; and
   a second upper jaw extending rearward from the upper edge margin of the base, the second upper jaw configured to engage the stud mounting bracket for use in attaching the box mounting bracket to the stud mounting bracket,
   a first lower jaw extending rearward from the lower edge margin of the base, the lower jaw being resiliently deflectable both relative to the base and independent of each of the first and second upper jaws when attaching the box mounting bracket to the stud mounting bracket,
   a second lower jaw extending rearward from the lower edge margin of the base, the second lower jaw being resiliently deflectable both relative to the base and independent of each of the first upper jaw, the second upper jaw, and the first lower jaw when attaching the box mounting bracket to the stud mounting bracket
   wherein the first and second upper jaws are resiliently deflectable both relative to the base and independent of one another when attaching the box mounting bracket to the stud mounting bracket.

9. The box mounting bracket as recited in claim 8, wherein each of the first and second upper jaws comprises a hook configured to prevent inadvertent removal of the box mounting bracket from the stud mounting bracket.

10. The box mounting bracket as recited in claim 9, further comprising a tang extending from each of the first and second lower jaws and configured to prevent inadvertent removal of the box mounting bracket from the stud mounting bracket.

11. The box mounting bracket as recited in claim 10, wherein each of the first and second lower jaws comprises an outer jaw arm and an inner jaw arm, each of the outer and inner jaw arms being resiliently deflectable both relative to the base and independent of one another.

12. The box mounting bracket as recited in claim 11, further comprising a connecting member interconnecting the outer arms of the first and second lower jaws.

13. A box mounting bracket for mounting a junction box on a stud mounting bracket, the box mounting bracket comprising:
   a base having a front face, a rear face, an upper edge margin and a lower edge margin, the base constructed for attaching a junction box to the front face thereof;
   a first upper jaw extending rearward from the upper edge margin of the base, the first upper jaw configured to engage the stud mounting bracket for use in attaching the box mounting bracket to the stud mounting bracket;
   a second upper jaw extending rearward from the upper edge margin of the base, the second upper jaw configured to engage the stud mounting bracket for use in attaching the box mounting bracket to the stud mounting bracket;
   a first lower jaw extending rearward from the lower edge margin of the base, the first lower jaw being resiliently deflectable both relative to the base and independent of each of the first and second upper jaws when attaching the box mounting bracket to the stud mounting bracket; and
   a tang extending from the first lower jaw and configured to prevent inadvertent removal of the box mounting bracket from the stud mounting bracket,
   wherein the first and second upper jaws are resiliently deflectable both relative to the base and independent of one another when attaching the box mounting bracket to the stud mounting bracket.

14. A box mounting bracket for mounting a junction box on a stud mounting bracket, the box mounting bracket comprising:
   a base having a front face, a rear face, an upper edge margin and a lower edge margin, the base constructed for attaching a junction box to the front face thereof;
   a first upper jaw extending rearward from the upper edge margin of the base, the first upper jaw configured to engage the stud mounting bracket for use in attaching the box mounting bracket to the stud mounting bracket; and
   a second upper jaw extending rearward from the upper edge margin of the base, the second upper jaw configured to engage the stud mounting bracket for use in attaching the box mounting bracket to the stud mounting bracket,
   wherein the first and second upper jaws are resiliently deflectable both relative to the base and independent of one another when attaching the box mounting bracket to the stud mounting bracket,
   wherein each of the first and second upper jaws comprises a hook configured to prevent inadvertent removal of the box mounting bracket from the stud mounting bracket.

15. A box mounting bracket for mounting a junction box on a stud mounting bracket, the box mounting bracket comprising:

a base having a front face, a rear face, an upper edge margin and a lower edge margin, the base constructed for attaching a junction box to the front face thereof;

a first lower jaw extending rearward from the lower edge margin of the base, the first lower jaw configured to engage the stud mounting bracket for use in attaching the box mounting bracket to the stud mounting bracket; and a second lower jaw extending rearward from the lower edge margin of the base, the second lower jaw configured to engage the stud mounting bracket for use in attaching the box mounting bracket to the stud mounting bracket, wherein the first and second lower jaws are resiliently deflectable both relative to the base and independent of one another when attaching the box mounting bracket to the stud mounting bracket, wherein each of the first and second lower jaws comprises an outer jaw arm and an inner jaw arm, each of the outer and inner jaw arms being resiliently deflectable both relative to the base and independent of one another.

16. The box mounting bracket as recited in claim 15, further comprising a connecting member interconnecting the outer arms of the first and second lower jaws.

17. The box mounting bracket as recited in claim 15, further comprising a tang extending from the first lower jaw and configured to prevent inadvertent removal of the box mounting bracket from the stud mounting bracket.

18. The box mounting bracket as recited in claim 17, further comprising a tang extending from the second lower jaw and configured to prevent inadvertent removal of the box mounting bracket from the stud mounting bracket.

19. The box mounting bracket as recited in claim 15, further comprising a first upper jaw extending rearward from the upper edge margin of the base, the first upper jaw configured to engage the stud mounting bracket for use in attaching the box mounting bracket to the stud mounting bracket.

20. The box mounting bracket as recited in claim 19, wherein the first upper jaw comprises a hook configured to prevent inadvertent removal of the box mounting bracket from the stud mounting bracket.

* * * * *